UNITED STATES PATENT OFFICE.

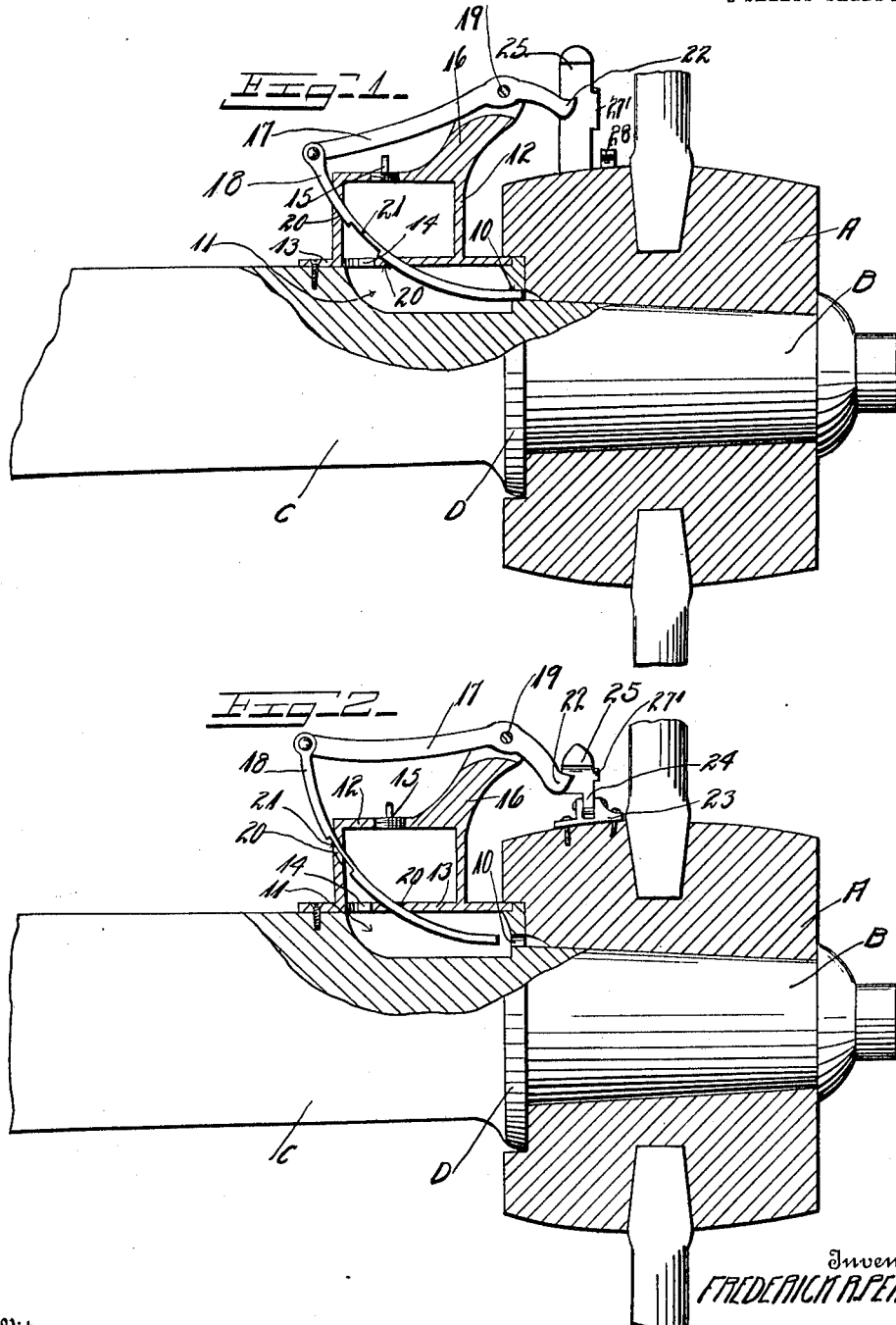

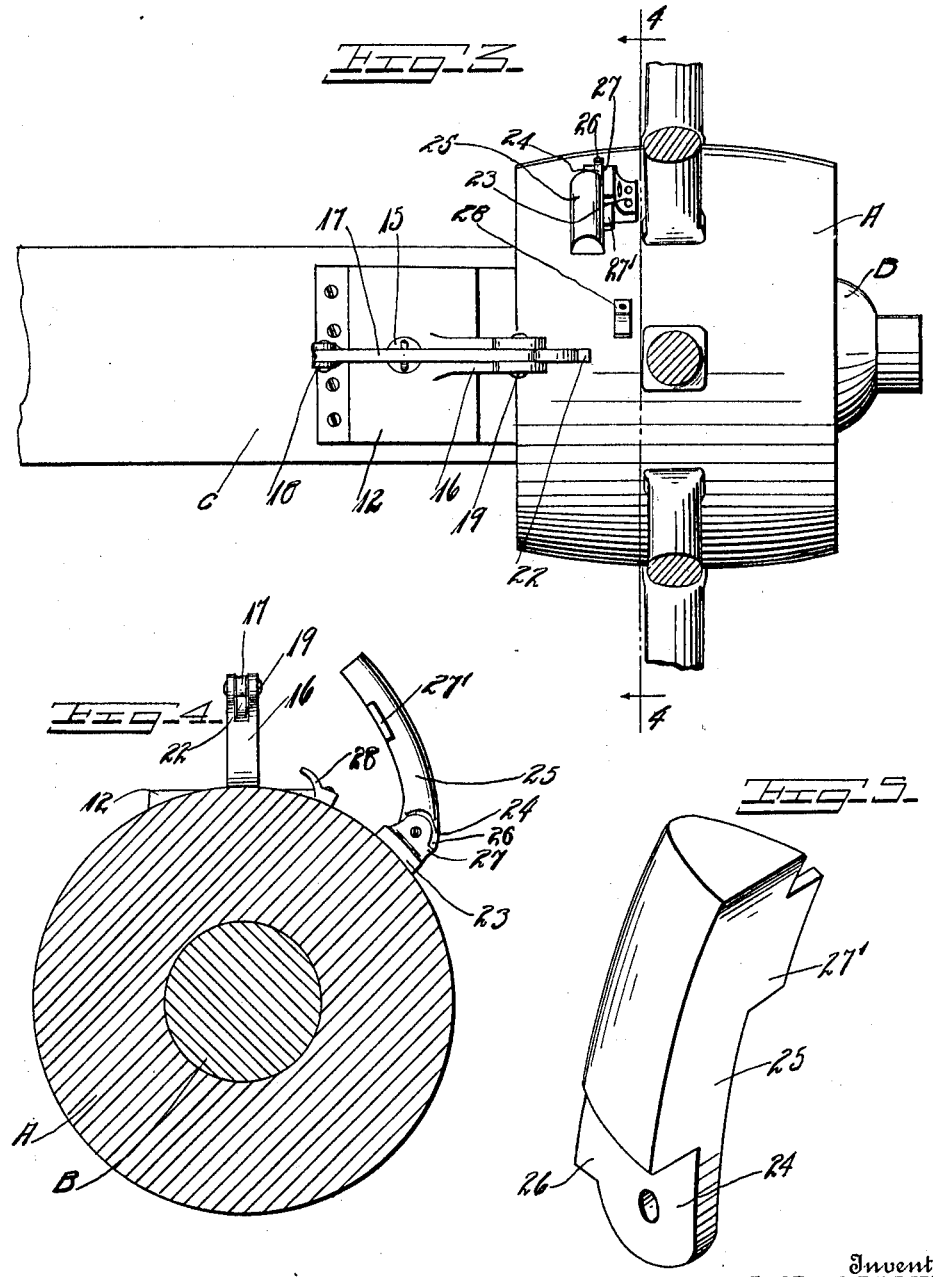

FREDERICK R. PETERSON, OF ESPANOLA, WASHINGTON.

LUBRICATOR.

1,035,465.   Specification of Letters Patent.   Patented Aug. 13, 1912.

Application filed July 23, 1910. Serial No. 573,426.

*To all whom it may concern:*

Be it known that I, FREDERICK R. PETERSON, a citizen of the United States, residing at Espanola, in the county of Spokane, State of Washington, have invented certain new and useful Improvements in Lubricators; and I do hereby declare the following to be a full, clear, and exact description of the invention, such as will enable others skilled in the art to which it appertains to make and use the same.

This invention relates to lubricating devices and has special reference to a form of oil cup mechanism adapted to be intermittently actuated so that oil is fed to a surface to be lubricated at spaced time intervals.

One object of the invention is to provide a novel form of oil cup having an improved feed mechanism.

A second object of the invention is to provide an improved form of actuating means for such mechanism.

With the above and other objects in view the invention consists in general of a novel form of feed mechanism for an oil cup and improved means for actuating said mechanism.

The invention further consists in certain novel details of construction and combinations of parts hereinafter fully described, illustrated in the accompanying drawings and specifically set forth in the claims.

In the accompanying drawings, like characters of reference indicate like parts in the several views, and Figure 1 is a section through a vehicle hub, the view showing the axle partly in section and illustrating the application of the invention to such a structure. Fig. 2 is a view similar to Fig. 1 but showing the parts in a different position. Fig. 3 is a plan view of the device applied to a vehicle axle and hub. Fig. 4 is a section on the line 4—4 of Fig. 3. Fig. 5 is a detail perspective of a certain striker used in connection with the invention.

While for the purpose of illustration there has been here shown a vehicle axle and hub it will be obvious from what follows that the device may be adapted for use with other structures such as loose pulleys and the like and the hub A of the showing here made will be referred to in the claims as a moving or rotating element. In this instance the hub A is journaled on an axle spindle B which has an extension C forming the thimble of the skein. Between the journal B and the portion C is a collar D. Through the collar D is formed an opening 10 which is so disposed that any oil flowing through this opening will lubricate the journal B. This opening 10 communicates with a pocket or recess 11 formed in the extension C.

The oil cup consists of a body portion 12 having a bottom 13 provided with an opening 14. This bottom serves to close the pocket 11 while the opening 14 affords communication between the interior of the oil cup and said pocket. The oil cup is furthermore provided with a filling opening closed by a plug 15 and extending upward and outward over the hub A is an ear 16 whereto is pivoted an arm 17. Secured pivotally to the end of the arm 17 which is remote from the hub A there is a plunger 18 curved to an arc concentric with the pivot point 19 of said arm and this plunger passes through suitable openings 20 formed in the oil cup, the proportions of the parts being such that when the end of the arm to which the plunger is secured is depressed the free end of the plunger will enter the opening 10, thus closing said opening. This plunger 18 is, furthermore, provided with a groove 21 which is so positioned and proportioned that when the plunger is in the position shown in Fig. 2 one end of the groove will communicate with the atmosphere outside of the oil cup while the other end of the groove will communicate with the inside of the oil cup, thus forming a vent and permitting air to enter said cup. The end of the arm 17 which projects over the hub A is provided with a lip 22. Now, if this end of the arm be depressed the parts will be caused to assume the position shown in Fig. 2. At this time a small quantity of oil or grease will enter the opening 10, the admission of air through the groove 21 permitting such flow of the oil. If, now, the plunger be moved downward to the position shown in Fig. 1 the end of the plunger will enter the opening 10 and, forcing the oil before it, will cause the oil contained in said opening to pass in onto the journal B. In order to provide means whereby this action of the arm may be automatically accomplished the hub A has secured thereto a lug 23 whereto is pivoted the offset reduced end 24 of a striker 25. This reduced end 24 is provided with a stop 26 which is adapted to coact with a stop 27 formed on the lug 23 so that the movement of the striker about the pivot is limited in one direction while the surface of the hub limits its movement in the opposite direction. This striker projects forwardly and has its forward face concaved to form a cam surface.

In operation, when the hub A is rotated, the forward or cam surface of the striker 25 will be caused to engage and depress the lip 22 of the arm 17, and thereby withdraw the plunger 18 from the opening 10. The continuous movement of the hub in the same direction causes the lip 22 to pass under the lower end of the arm 25, and thereby permit the arm 17 and the plunger 18 to return to their normal positions. It will furthermore be observed that when the hub A is rotated in the reverse direction, the striker 25 will swing inwardly so that it can readily pass under the lip 22.

For the purpose of rendering the device inoperative when desired the striker is provided with a tongue 27' which projects laterally therefrom and on the hub A is pivoted a keeper 28. This keeper is so arranged that when turned parallel to the axis of the hub it will engage over the tongue 27' thus preventing any movement of said striker. If the striker be thus held and the hub be rotated the striker will pass beneath that end of the arm 17 which projects over the hub and the arm will thus remain inoperative.

There has thus been provided a simple and efficient device of the kind described and for the purpose specified.

Having thus described the invention, what is claimed as new, is:—

1. In a lubricator of the class described, an oil cup, an actuating arm pivoted to said cup, a moving element adjacent said arm, a striker means pivoted to said element and adapted to engage the end of said arm when the element reaches a predetermined point in its movement.

2. In a lubricator of the class described, an oil cup, an actuating arm pivoted to said cup, a rotating element adjacent said arm, a striker pivoted on the element and adapted to swing outwardly from the element during a portion of the movement of said element, said striker being provided with a stop to limit its movement in one direction, the stop being so positioned as to hold the striker away from the element during a second portion of the rotation of said element and to permit it to strike the arm.

3. In a lubricator of the class described, an oil cup, an actuating arm pivoted to said cup, a rotating element adjacent said arm, a striker pivoted on the element and adapted to swing outwardly from the element during a portion of the movement of said element, said striker being provided with a stop to limit its movement in one direction, the stop being so positioned as to hold the striker away from the element during a second portion of the rotation of said element and to permit it to engage said arm when in position to strike the arm, and a clip on said element engageable with the striker to prevent movement of said striker with respect to said element.

4. In a lubricator of the class described, a journal having a collar at one end provided with an opening, an extension from said journal having a pocket communicating with said opening, an oil cup having a bottom feeding over said pocket and provided with an opening affording communication between said cup and pocket, an ear projecting from said cup, an arm pivoted to said ear, an arcuate plunger connected to said arm and having its free end adapted for movement into and out of said collar opening, a hub on said journal, and actuating means for said arm carried by said hub.

5. In a lubricator of the class described, a journal having a collar at one end provided with an opening, an extension from said journal having a pocket communicating with said opening, an oil cup having a bottom feeding over said pocket and being provided with an opening affording communication between said cup and pocket, an ear projecting from said cup, an arm pivoted to said ear, an arcuate plunger connected to said arm and having its free end adapted for movement into and out of said collar opening, said plunger also having a longitudinal groove, the groove having one end outside of and the other end inside of the cup when the plunger is at a predetermined point of its movement, a hub on said journal, and actuating means for said arm carried by said hub.

6. In a lubricator of the class described, a journal having a collar at one end provided with an opening, an extension from said journal having a pocket communicating with said opening, an oil cup having a bottom feeding over said pocket and being provided with an opening affording communication between said cup and pocket, an ear projecting from said cup, an arm pivoted to said ear, an arcuate plunger connected to said arm and having its free end adapted for movement into and out of said collar opening, said plunger also having a longitudinal groove, the groove having one end outside of and the other end inside of the cup when the plunger is at a predetermined point of its movement, a hub on said journal, actuating means for said arm carried by said hub, and releasable restraining means holding said actuating means inoperative.

In testimony whereof, I affix my signature, in presence of two witnesses.

FREDERICK R. PETERSON.

Witnesses:
 EMILY HALLETT,
 STANLEY HALLETT.